US008918144B2

(12) United States Patent
Shu (10) Patent No.: US 8,918,144 B2
(45) Date of Patent: Dec. 23, 2014

(54) PERSONAL COMPUTER WITH DETACHABLE WIRELESS TELEPHONE

(76) Inventor: Paul Shu, Fremont, CA (US)

( * ) Notice: Subject to any disclaimer, the term of this patent is extended or adjusted under 35 U.S.C. 154(b) by 229 days.

(21) Appl. No.: 13/543,573

(22) Filed: Jul. 6, 2012

(65) Prior Publication Data

US 2013/0288747 A1 Oct. 31, 2013

Related U.S. Application Data

(60) Provisional application No. 61/640,364, filed on Apr. 30, 2012.

(51) Int. Cl.
*H04B 1/38* (2006.01)

(52) U.S. Cl.
USPC ........................................................ 455/558

(58) Field of Classification Search
CPC ..... H04W 88/00; H04W 88/02; H04W 92/02; H04W 92/16; H04M 2250/14; H04M 1/026; G06F 21/34
USPC ........................................................ 455/558
See application file for complete search history.

(56) References Cited

U.S. PATENT DOCUMENTS

| | | | |
|---|---|---|---|
| D344,074 S | 2/1994 | Collins | |
| 5,625,673 A * | 4/1997 | Grewe et al. | 455/556.2 |
| 6,240,302 B1 * | 5/2001 | Harrison | 455/556.1 |
| 6,625,471 B2 * | 9/2003 | Mori et al. | 455/557 |
| 6,757,551 B2 | 6/2004 | Newman et al. | |
| 7,107,072 B1 * | 9/2006 | Smith | 455/556.2 |
| 8,060,139 B2 * | 11/2011 | Yaqub et al. | 455/558 |
| 2001/0031645 A1 | 10/2001 | Jarrett | |
| 2004/0235522 A1 | 11/2004 | Lin | |
| 2005/0159184 A1 | 7/2005 | Kerner et al. | |
| 2008/0113687 A1 * | 5/2008 | Prendergast et al. | 455/558 |
| 2009/0209287 A1 | 8/2009 | Ravelo | |
| 2010/0035650 A1 * | 2/2010 | Gottehrer et al. | 455/558 |
| 2011/0092252 A1 | 4/2011 | Besay | |
| 2011/0319132 A1 * | 12/2011 | Hsu | 455/558 |
| 2012/0034933 A1 | 2/2012 | Bradley | |
| 2012/0196654 A1 * | 8/2012 | Jin et al. | 455/558 |

FOREIGN PATENT DOCUMENTS

| | | |
|---|---|---|
| WO | WO 2004/021715 A2 | 3/2004 |
| WO | WO 2005/015931 A1 | 2/2005 |
| WO | WO 2010/123334 A1 | 10/2010 |

* cited by examiner

*Primary Examiner* — Marisol Figueroa
(74) *Attorney, Agent, or Firm* — GSS Law Group (57) ABSTRACT

A Subscriber Identification Module (SIM) card enclosure is formed with an internal cavity adapted to receive a SIM card and a cellular transceiver. A wireless telephone is adapted for docking with the SIM card enclosure. A personal computer includes a docking receptacle for holding the SIM card enclosure and wireless telephone. The personal computer may communicate over a cellular telephone network when the SIM card enclosure is docked to the personal computer. The wireless telephone may conduct voice calls over a wireless link with the personal computer when the wireless telephone is undocked from both the personal computer and SIM card enclosure. The wireless telephone may communicate over a cellular telephone network when the SIM card enclosure is docked to the wireless telephone. Voice communications between the wireless telephone and personal computer may be conducted concurrently with data communications between the personal computer and the cellular telephone network.

17 Claims, 10 Drawing Sheets

PERSONAL COMPUTER WITH DETACHABLE WIRELESS TELEPHONE

CROSS REFERENCE

This application claims the benefit of U.S. Provisional Application No. 61/640,364, filed on Apr. 30, 2012 and incorporated herein by reference in its entirety.

FIELD OF THE INVENTION

Embodiments of the invention relate generally to an apparatus combining a personal computer with a wireless telephone that may be docked to the personal computer and a SIM card enclosure that may be docked to either the personal computer, the wireless telephone, or simultaneously to both.

BACKGROUND

A cellular telephone built on a mobile computing platform, sometimes referred to as a smartphone, includes computing and communication resources that enable a software application running on the smartphone, for example a web browser, to access and interact with Internet web pages and other data sources. A cellular telephone lacking some of the computing and communication enhancements included in a smartphone, for example a phone lacking a web browser, may be referred to as a "feature phone." Smartphones may be capable of executing software applications such as interactive calendars, games, and other general-purpose applications selected and installed by the smartphone's user. However, some software applications on a smartphone may be unavailable for use while the smartphone is sending or receiving voice calls. Some software applications may interfere with sending or receiving a voice call on a smartphone while an application is running. Some software applications may be difficult to control or view on the relatively small displays provided on some smartphones. Controlling an application or reading the smartphone's display may be impractical or inconvenient while a voice call is in progress. Some users may therefore prefer to run some software applications on a portable personal computer, which generally has a larger, higher-resolution display than a smartphone, especially when a user desires to conduct voice communications while operating a software application. Some users may prefer a full-size keyboard and cursor control device connected to a personal computer over soft keys or small keypad buttons on a smartphone, for example when a large number of characters are to be typed, fine control of a cursor on a display is important, or data entry accuracy is important.

Cellular modems are available for sending and receiving data, for example documents, Internet email, email attachments, RSS feeds, audio files or streams, video files or streams, and the like over a cellular telephone network. A cellular modem may be an integral part of a personal computer or may be an external device which connects to an interface port on the personal computer, for example a USB port. A smartphone or a personal computer with an internal cellular modem or connected to an external cellular modem may be operable as a wireless LAN access point, sometimes referred to as a "WiFi hotspot", for example to enable other devices to access the smartphone or cellular modem's Internet connection or to form an ad hoc network. However, a smartphone may not be operable for placing or receiving telephone calls for voice communications (also referred to as "voice calls") while operating as a WiFi hotspot. A user may find it inconvenient to send or receive voice calls while a smartphone is connected by an electrical cable to a personal computer. Establishing data communication between a smartphone and a personal computer, sometimes referred to as "tethering", may not be possible if a suitable interconnecting electrical cable is not available or has been left behind or misplaced.

A Subscriber Identity Module (SIM) stores identity and authentication data in an electronic device used by a subscriber to a cellular telephone network. A SIM is an integrated circuit that may be provided in a standardized package referred to as a SIM card. A SIM card may be placed inside a cellular phone or portable computer to protect the SIM card from damage by impact, flexure, electrostatic shock, and circuit damage from dirt and other contaminants, and to enable the device holding the SIM card to communicate with a cellular telephone network. For example, a cellular telephone may be provided with a cavity adapted to receive a SIM card. An electrical connector in the cavity and a corresponding mating connector or contact pads on the SIM card enable data communication between the SIM card and other components in the cellular telephone. The cavity holding the SIM card may be covered by a removable battery or a detachable cover. A SIM card may comply with one or more electrical and mechanical standards, for example standards published by ISO/IEC, ETSI, JEDEC, or others. SIM cards may be provided in different standard sizes, some of which are referred to as full-size, mini-SIM, micro-SIM, nano-SIM, and embedded SIM.

A SIM card may be transferable from a cellular telephone to another cellular-enabled device, for example another cellular telephone, a cellular modem, or a personal computer. However, a cellular telephone or smartphone may be unable to send or receive voice calls or other data after the SIM card has been removed from the phone.

SUMMARY

An apparatus includes a Subscriber Identification Module (SIM) card enclosure formed with an internal cavity adapted to receive a SIM card, a wireless telephone adapted for docking with the SIM card enclosure, and a personal computer with a docking receptacle formed in part of the personal computer's enclosure. The shape and dimensions of the docking receptacle are selected for a secure fit of the SIM card enclosure and wireless telephone in the receptacle. The personal computer is capable of communicating over a cellular telephone network when a SIM card is installed in the SIM card enclosure and the SIM card enclosure is docked to the personal computer. The wireless telephone is capable of communicating over a wireless communications link with the personal computer when the wireless telephone is undocked from the personal computer. The wireless telephone is able to send and receive voice calls when the SIM card enclosure is disconnected from the wireless telephone. The personal computer is able to send and receive data over the cellular telephone network, including data corresponding to voice calls, even when the wireless telephone is turned off or is not being used for sending or receiving voice calls or exchanging data with any other device.

DESCRIPTION

Embodiments of the invention include a combination of a personal computer, a wireless telephone, and a Subscriber Identification Module (SIM) card enclosure. The SIM card enclosure includes electrical and mechanical interfaces for holding a SIM card and a cellular network transceiver inside the SIM card enclosure and for making electrical and mechanical connections between the SIM card enclosure, the personal computer, and the wireless telephone. The SIM card enclosure may optionally be docked to the personal computer by engaging the SIM card enclosure with a docking receptacle on the personal computer. In some embodiments of the invention, the wireless telephone may be docked to the personal computer by docking the SIM card enclosure to the personal computer, installing the wireless telephone in the docking receptacle in the personal computer, and electrically and mechanically connecting the wireless telephone to the SIM card enclosure. In other embodiments of the invention, the SIM card enclosure may be docked to a docking receptacle in the wireless phone and the wireless phone may be docked to another docking receptacle in the personal computer. In some embodiments of the invention, the personal computer provides separate docking receptacles for the wireless phone and SIM card enclosure.

Two components are referred to herein as "docked" when the components are in contact with one another and connected mechanically and electrically. Two components are "undocked" when they are electrically and mechanically disconnected from one another. Two components are considered to be mechanically connected when the two components are in direct contact with one another and are being held together by a latch, connector, or similar means, and are securely connected when the two components remain docked to each other during the described use of the components. Two components are considered to be electrically connected when electrical current may flow from one of the components to the other. "Data" as used herein refers to digital data sent from one device to another, including digital data corresponding to voice calls and other digital data corresponding to, for example, but not limited to, Internet web pages, email, email attachments, document files, security certificates, video files, audio files, and so on.

A conventional SIM card is retained inside a cavity in the SIM card enclosure to provide mechanical support and impact protection to the SIM card and to protect the SIM card from electrostatic shock and exposure to dirt, dust, and other contaminants. The SIM card enclosure provides a convenient, easily handled device for sharing one SIM card and one cellular transceiver between the personal computer and the wireless telephone in an embodiment of the invention. A cellular transceiver is a device for conducting two-way wireless communications between an embodiment of the invention and a cellular telephone network. In some embodiments of a SIM card enclosure, the SIM card and cellular transceiver are completely enclosed within the enclosure and are accessible by opening a removable cover on the SIM card enclosure.

When the SIM card enclosure is docked to the personal computer, the SIM card and cellular transceiver inside the SIM card enclosure may exchange data, for example subscriber information related to cellular network access, with the personal computer to enable the personal computer to conduct voice calls and other data communications over a cellular telephone network. Alternatively, in some embodiments of the invention, the SIM card enclosure docks to a docking receptacle in the wireless phone, and the PC is able to access the SIM card and cellular transceiver in the SIM card enclosure for cellular network communications when the SIM card enclosure is docked to the wireless phone and the wireless phone is docked to the personal computer or when the wireless phone is undocked from the personal computer, the SIM card enclosure is undocked from the wireless phone, and the SIM card enclosure is docked to the personal computer. As long as the SIM card enclosure is electrically connected to the personal computer, the personal computer can send and receive data over the cellular telephone network, even when the wireless telephone is undocked from the personal computer, the wireless telephone is being used for a voice call, the wireless telephone is turned off, or the wireless telephone is not communicating with any other device.

When the wireless telephone is undocked from the personal computer and the SIM card enclosure is docked to the personal computer, the wireless telephone functions as a cordless telephone and is able to conduct voice calls between a transceiver in the wireless telephone and a transceiver in the personal computer, or optionally with transceivers in other devices. The undocked wireless telephone may communicate voice and other data over a local wireless communication channel established between the wireless telephone and the personal computer, for example a wireless communication channel compliant with Bluetooth® protocols. Voice call data and other data exchanged between the undocked wireless telephone and the personal computer over a local wireless communication channel may optionally be exchanged between the personal computer and a cellular communication network when the SIM card enclosure is docked to the personal computer.

Voice communications between the undocked wireless telephone and the personal computer may occur concurrently with other data communications between the personal computer and the cellular telephone network when the SIM card enclosure is docked to the personal computer. When the SIM card enclosure is docked to the personal computer, the personal computer may optionally operate as a WiFi hotspot in a wireless local area network. When the SIM card enclosure is electrically and mechanically connected to the undocked wireless telephone, the wireless telephone may operate as a cellular telephone for making and receiving voice calls over a cellular telephone network, independently of the personal computer. When the SIM card enclosure is docked to the wireless telephone and both are undocked from the personal computer, the wireless telephone may optionally operate as a WiFi hotspot in a wireless local area network. The SIM card enclosure enables a single SIM card and cellular transceiver to be shared between a personal computer and a wireless telephone, offering a convenient way to execute Internet-enabled applications software on the personal computer while simultaneously conducting voice communications on the undocked wireless telephone.

Embodiments of the invention have several advantages compared to a previously known method referred to as "tethering" for sharing a prior-art smartphone's data services with a personal computer. When a prior-art smartphone is tethered to a personal computer, the SIM card and cellular transceiver remains in the smartphone and a data connection is made between the smartphone and the personal computer, either by connecting an electrical cable between the two or by a wireless link such as Bluetooth®. If a user holds the smartphone to his or her ear to listen to a voice call, the smartphone's display may not be visible to the user. While tethered, the prior-art smartphone's battery may be drained rapidly while the personal computer uses the phone's cellular transceiver and data service to communicate over a cellular telephone network. Voice call services on a prior-art smartphone may be unavailable while a personal computer is tethered to the smartphone and the personal computer is using the phone's data service. The SIM card from a prior-art cellular telephone or prior-art smartphone can only be transferred to another device which uses the same type of SIM card, that is, the mechanical and electrical interfaces must be the same, and the data saved in the SIM card must be compatible with both devices. In prior-art smartphones, the cellular transceiver is generally not accessible to the phone's user and remains with the smartphone during normal use of the phone, whether tethered or untethered.

Opening a prior-art smartphone to remove the SIM card may expose interior parts of the phone and the SIM card to mechanical or electrical damage. The SIM card and other small parts may be easily misplaced or damaged after they are removed from a prior-art smartphone or other prior-art device. Removing a small SIM card from a prior-art phone and reconnecting it to an electrical connector in another device may be difficult, particularly under poor lighting conditions or if the person making these changes has poor finger dexterity or is distracted. In some prior-art feature phones and smartphones, the SIM card is concealed under a battery that is under a removable cover. It may therefore not be obvious where the SIM card is located on a prior-art smartphone, how the SIM card is to be removed from the phone, whether or not the removed SIM card will be compatible with another device, or how the SIM card is to be inserted into another compatible device.

In contrast to tethering a prior-art cellular telephone or prior-art smartphone to a personal computer, embodiments of the invention are easily and securely interconnected without handling small parts or opening up a phone's case to expose internal electrical connections. Mechanical and electrical compatibility between a SIM card enclosure and its associated personal computer and wireless telephone can be assured by selectively keying electrical connectors so that only compatible models may be connected to one another. No external electrical cable is needed to make electrical connections between the wireless telephone and SIM card enclosure or between the SIM card enclosure and the personal computer. A SIM card enclosure may easily be made with different alternative internal configurations for different sizes of SIM cards or for cellular transceivers for different cellular networks, or may optionally be made to accept more than one size of SIM card. For example, alternative embodiments of a SIM card enclosure may adapted to receive a cellular transceiver for bidirectional communications with CDMA (code division multiple access) cellular telephone networks, GSM (global system for mobile communications) cellular telephone networks, or cellular transceivers for communicating with other cellular telephone network communication technologies.

Voice and data communications may optionally be conducted simultaneously, permitting a user to hold the wireless telephone against his or her ear in the conventional manner while viewing web sites or other information on the personal computer's display. Data may be entered using the personal computer's input peripherals, for example an alphanumeric keyboard, mouse, or touchscreen, while speaking on the wireless telephone. Data communications between the personal computer and a cellular telephone network do not draw power from the wireless telephone's battery. The wireless telephone's battery may optionally be recharged from the personal computer while the phone is docked to the computer. One SIM card may alternately be used for communications between the wireless telephone and a cellular network when the SIM card enclosure is docked to the wireless telephone or between the personal computer and the cellular network when the SIM card enclosure is docked to the personal computer.

Although a SIM is used herein as an example of a device for storing identity and authentication information for a cellular telephone network, other devices for storing such information are known in the art and are considered to be within the scope of the embodiments disclosed herein. For example, a Re-Usable Identification Module (R-UIM) is an alternative to a SIM for some cellular networks. Other modules suitable for use with embodiments of the invention may support both SIM and R-UIM standards. In an alternative embodiment of the invention, a SIM card enclosure includes mechanical and electrical interfaces to an R-UIM for a cellular telephone.

Figure 1:
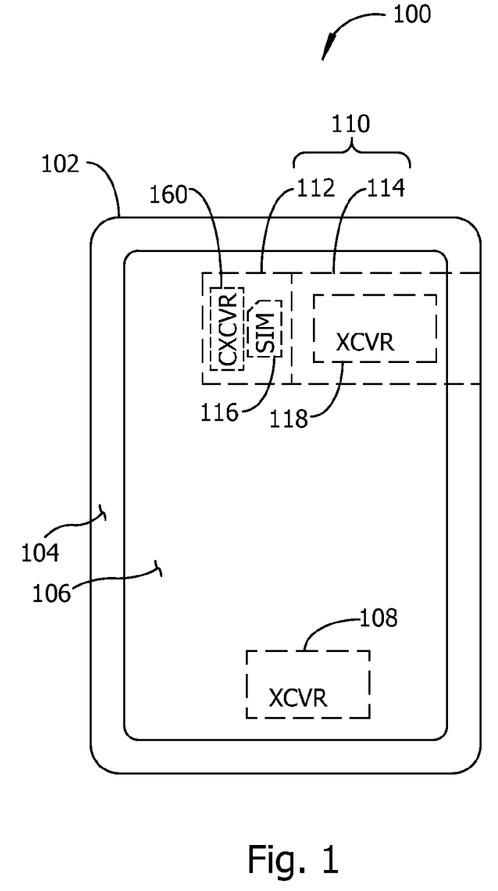
FIG. 1 is a view toward the front side of an example of an embodiment of the invention comprising a combination of a personal computer, a SIM card enclosure, and a wireless telephone.

Referring now to the figures, an example of a personal computer with a detachable wireless telephone and a detachable SIM card enclosure is shown in FIG. 1. The example of an embodiment of the invention 100 includes a personal computer (PC) 102 comprising an enclosure 104 and a display 106. The PC 102 in FIG. 1 represents an example of a tablet PC in which the display 106 is integrated into the enclosure 104. Other examples of personal computers suitable for use with an embodiment of the invention include, but are not limited to, a laptop PC, a netbook, an e-reader, an e-book, and a notebook PC. The PC 102 includes technology for short range wireless voice and data communications, represented in the figures by a wireless communications transceiver (XCVR) 108. The PC further includes electrical connectors and mechanical features for docking a cellular telephone 110 comprising a wireless telephone 114 and a SIM card enclosure 112. The SIM card enclosure 112 provides mechanical support and protection and electrical connections to a SIM card 116 and a cellular transceiver CXCVR 160 held within the SIM card enclosure. The wireless telephone 114 includes a short-range wireless communications transceiver XCVR 118 capable of communicating signals representative of voice and data with the XCVR 108 in the personal computer 102. In some embodiments of the invention, the XCVR 118 in the wireless telephone 114 and the corresponding compatible XCVR 108 in the personal computer 102 communicate according to Bluetooth® protocols.

The SIM card enclosure 112 and wireless telephone 114, when electrically and mechanically connected to one another and with both components undocked from the personal computer 102, may be operated as a cellular telephone 110 for conducting voice calls and optionally for operating as a WiFi hotspot. The wireless telephone 114, or alternately the SIM card enclosure 112 without the wireless telephone 114, may be docked to the PC 102. An example of a cellular telephone 110 comprising the wireless telephone 114 and SIM card enclosure 112 docked to the PC 102 is shown in the side view of FIG. 2.

Figure 2:
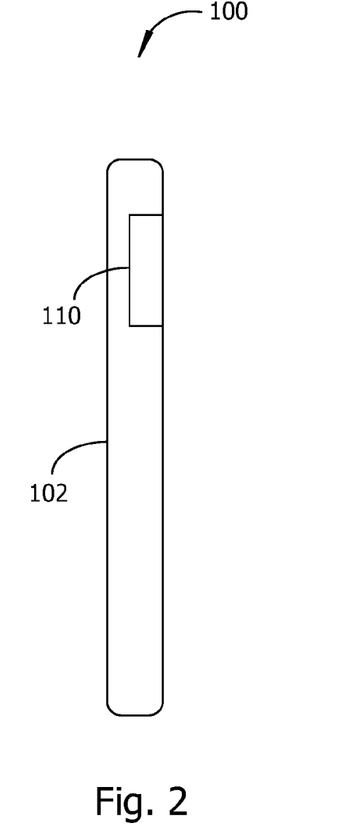
FIG. 2 is a view toward the right side of the example of a personal computer and wireless telephone of FIG. 1.
Figure 3:
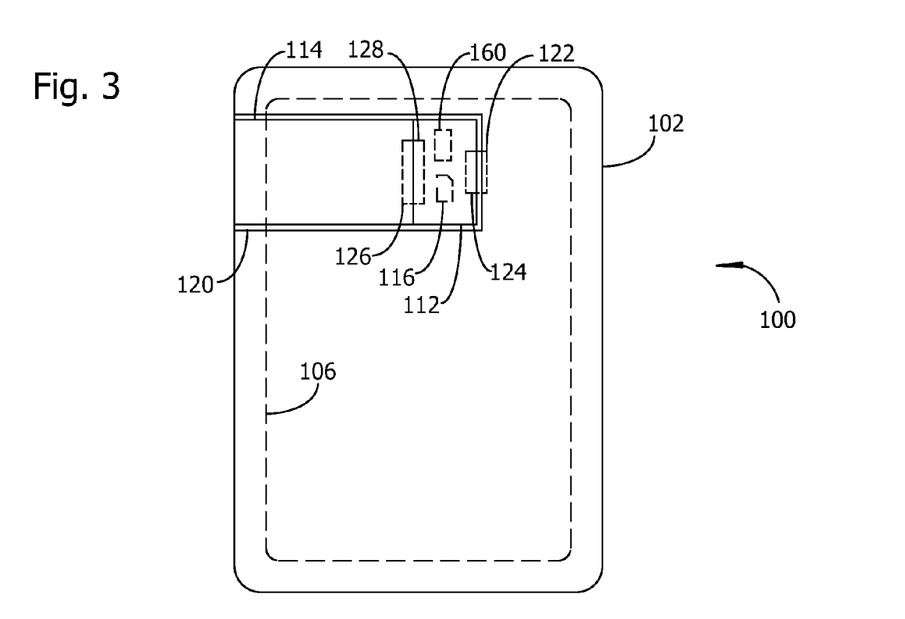
FIG. 3 is view toward the back side of the enclosure for the example of a personal computer of FIGS. 1-2, showing an example of a wireless telephone with a SIM card enclosure installed in a docking receptacle formed on the back and right sides of the personal computer.

FIG. 3 shows the example of FIGS. 1-2 in a view toward the back side of the PC 102. The example embodiment of the invention 100 of FIG. 3 shows the example of a wireless telephone 114 connected to the example of a SIM card enclosure 112, with both components securely engaged with a docking receptacle 120 in the enclosure for the PC 102. A phone-SIM connector 126 on the wireless telephone 114 electrically and mechanically connects the wireless telephone 114 to a corresponding phone-SIM mating connector 128 on the SIM card enclosure 112. A PC-SIM connector 122 on the PC 102 provides electrical and mechanical connections to a corresponding PC-SIM mating connector 124 on the SIM card enclosure 112. The PC 102 may optionally provide power through the electrical connectors (122, 124, 126, 128) for recharging a battery (battery example shown in FIG. 9) in the wireless telephone 114. In some embodiments of the invention 100, the connectors (122, 124, 126, 128) are arranged so that the side of the wireless telephone 114 with the phone's keypad and display face outward, that is, the telephone's display and keypad are visible when the wireless telephone is docked to the PC 102 in the docking receptacle 120. In alternative embodiments of the invention 100, the connectors are arranged so that the wireless telephone 114 is docked with its keypad and display facing the interior of the PC, thereby covering and protecting the telephone's display and keypad.

Figure 4:
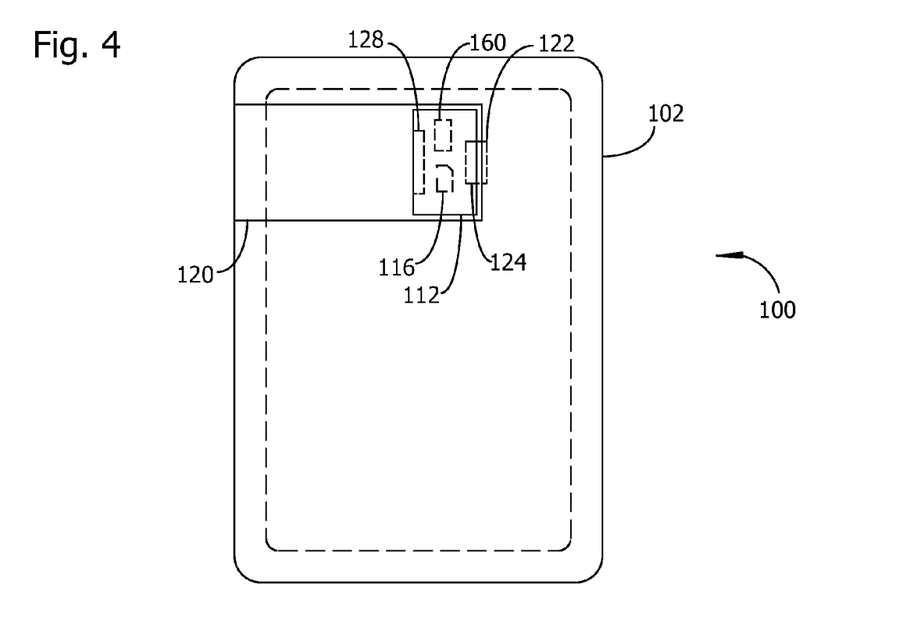
FIG. 4 is a view toward the back side of the personal computer of FIGS. 1-3, showing the SIM card enclosure installed in the docking receptacle without the wireless telephone.

FIG. 4 shows the same viewing direction as FIG. 3, but with the wireless telephone removed from the docking receptacle 120 and the SIM card enclosure 112 connected to the PC 102 as described for FIG. 3. In either of the configurations shown in FIG. 3 and FIG. 4, the PC 102 may use the SIM card 116 and the cellular transceiver 160 in the SIM card enclosure 112 for voice and data communications over a cellular telephone network. In FIGS. 3-4, the example of a docking receptacle 120 is shown as a channel formed in the back side of the PC 102 and extending through the right side. In alternative embodiments of the invention, the docking receptacle is formed with other shapes or at other locations on the PC than those illustrated.

Figure 5:
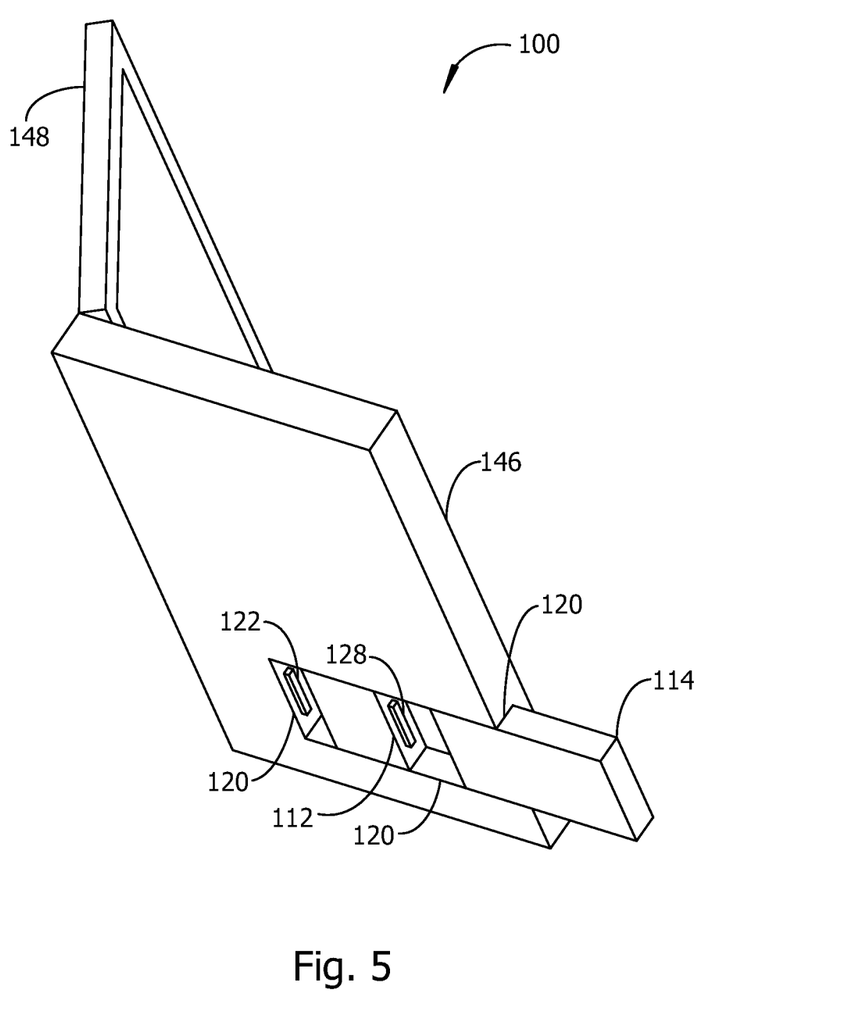
FIG. 5 is a pictorial view of another example of an embodiment of the invention showing a personal computer with a fold-down display deployed for viewing the display, a SIM card enclosure inserted into a docking receptacle formed in the bottom and front sides of the personal computer, and a wireless telephone partially inserted into the docking receptacle from the front side of the personal computer.
Figure 6:
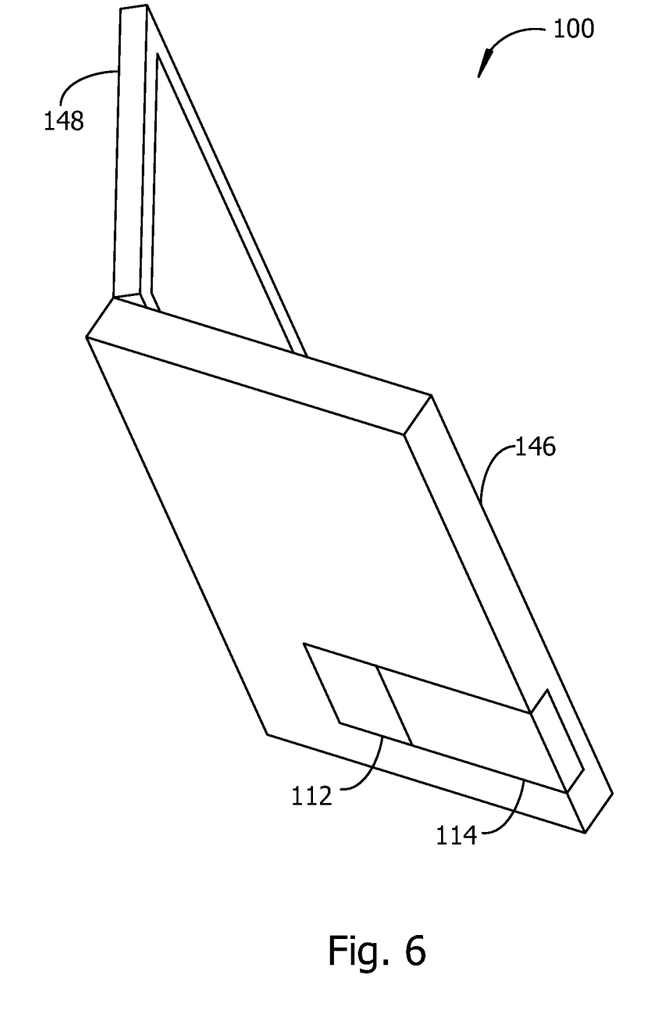
FIG. 6 continues the example of FIG. 5, showing the SIM card enclosure and wireless telephone fully inserted in the receptacle and docked to the personal computer.

FIG. 5 shows an example of an alternative embodiment of the invention 100 comprising a personal computer 146 having a fold-down display 148. The personal computer 146 in the example of FIG. 5 is representative of a laptop computer, a netbook, or a notebook computer, and is illustrated with the display 148 unfolded for viewing displayed information. An example of a docking receptacle 120 is visible on a bottom side of the personal computer 146. An example of a PC-SIM connector 122 is visible at an end of the docking receptacle 120. The SIM card enclosure 112 is shown in the docking receptacle 120, but not yet docked to the personal computer 146, that is, the SIM card enclosure is not electrically connected to the PC-SIM connector 122. A phone-SIM mating connector 128 is visible on a side of the SIM card enclosure. A simplified representation of an example of a wireless telephone 114 is shown partially inserted into the docking receptacle 120. In the example of 5, the wireless telephone is not electrically connected to the phone-SIM mating connector 120 on the SIM card enclosure 112. FIG. 6 continues the example of FIG. 5, showing the SIM card enclosure 112 docked to the personal computer 146 and the wireless telephone 114 docked to the SIM card enclosure 112 and to the personal computer 146, with the wireless telephone's display and keypad (not visible in this view) facing away from the bottom of the computer 146 so as to protect the display from damage and to protect the keypad from accidental key activation.

Figure 13:
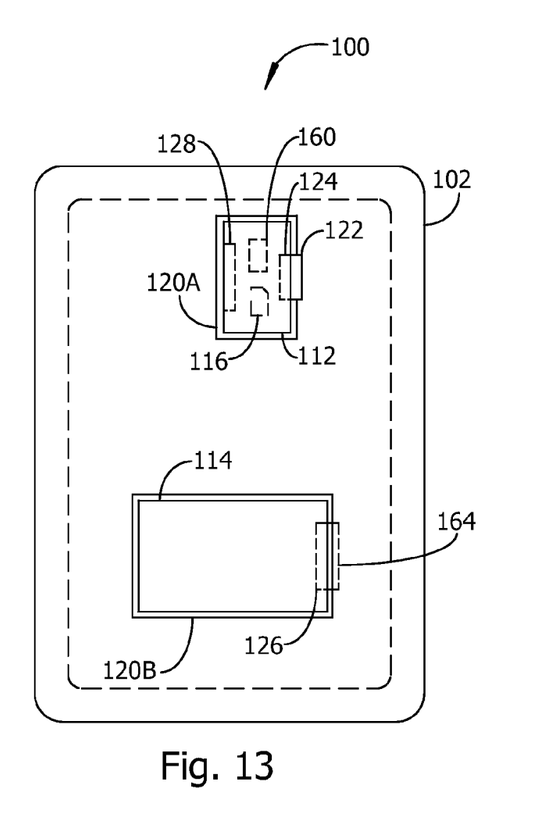
FIG. 13 is a view toward the back side of the example of a personal computer, showing optional separate docking receptacles for the wireless telephone and SIM card enclosure.

In FIGS. 5-6, the example of a docking receptacle 120 is shown as a channel on the bottom side and extending through the front side of the personal computer 146. In alternative embodiments of the invention, a docking receptacle may be formed entirely on one side of a personal computer 146, not extending to another side. For example, a docking receptacle may be formed on the same side as a keyboard, or in a fold-down display, or on one side of a PC enclosure. In some embodiments of the invention, more than one docking receptacle may be provided, for example separate docking receptacles for the SIM card enclosure and wireless telephone, as shown in the example of FIG. 13 which has a docking receptacle 120A for the SIM card enclosure 112 and another docking receptacle 120B for the wireless telephone 114. In some embodiments of the invention, a docking receptacle may be formed as an aperture or pocket. A PC-SIM connector in the aperture or pocket provides for docking a SIM card enclosure. The shape of the aperture or pocket optionally provides mechanical retention of a wireless telephone and SIM card enclosure, for example by a snap fit of the parts, by a sliding or removable cover, or by slidably engaging a tab on one part with a corresponding slot on another part. Optional latches, clips, captive quarter-turn fasteners, or similar retaining hardware may be provided to securely hold the wireless telephone and SIM card enclosure into the aperture or pocket in the personal computer or for holding the SIM card enclosure to the wireless telephone.

Figure 7:
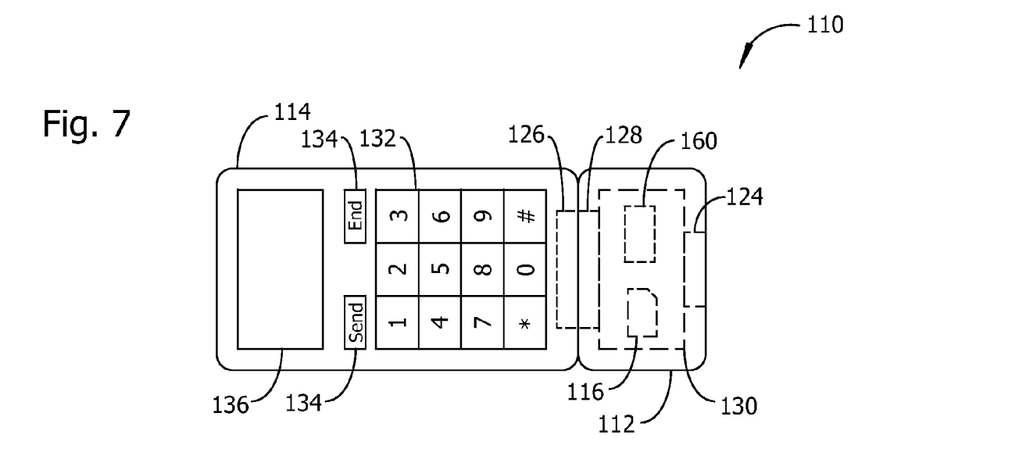
FIG. 7 is a view toward the front side of an example of a wireless telephone in accord with an embodiment of the invention, illustrating an example of a SIM card enclosure electrically and mechanically connected to the wireless telephone and a SIM card and cellular transceiver inside the SIM card enclosure.

An example of a cellular telephone 110 embodiment of the invention is shown in FIG. 7. The example of a cellular telephone 110 includes a wireless telephone 114 docked to a SIM card enclosure 112. The SIM card enclosure 112 includes a SIM card cover 130 over a SIM card 116 and cellular transceiver 160. When the SIM card cover 130 is in place over the SIM card 116, the SIM card is totally enclosed within and protected by the SIM card enclosure 112. The PC-SIM mating connector 124 is part of the SIM card enclosure and remains with the SIM card enclosure when the enclosure is disconnected from the PC 102 (ref. FIG. 1). The phone-SIM mating connector 128 is also part of the SIM card enclosure 112 and remains with the SIM card enclosure when the SIM card enclosure is disconnected from the wireless telephone 114. The wireless telephone 114 includes an alphanumeric keypad 132 and optionally includes one or more function keys 134. An optional display 136 provides for display of telephone numbers and other information. The display 136 may be implemented as a liquid crystal display (LCD), a light emitting diode display (LED), or other flat-screen display technologies. The wireless telephone 114 and SIM card enclosure 112 are shown again in a view toward the side of the cellular telephone 110 in FIG. 8.

Figure 8:
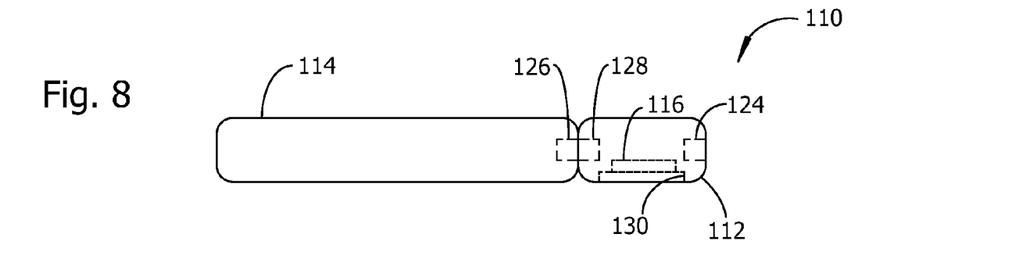
FIG. 8 is a view toward the left side of the example of a wireless telephone and SIM card enclosure from FIG. 7.
Figure 9:
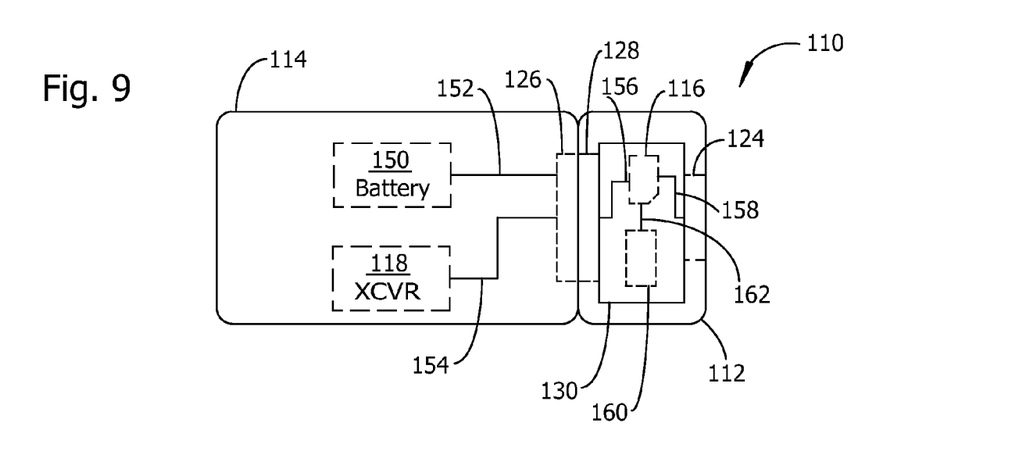
FIG. 9 is a view toward the back side of the example of a wireless telephone from FIGS. 7-8.

FIG. 9 continues the examples of FIGS. 7-8, showing the example cellular telephone 110 from the back side with the SIM card enclosure docked to the wireless telephone 114. The SIM card 116 and cellular transceiver 160 in the SIM card enclosure 112 is contained within a cavity in the enclosure and covered by the SIM card cover 130, as suggested by the hidden lines used to draw the SIM card and cellular transceiver. One or more electrical connections 158 connect the SIM card 116 to the PC-SIM mating connector 124. One or more electrical connections 156 connect the SIM card 116 to the phone-SIM mating connector 128. One or more electrical connections 162 connect the cellular transceiver 160 to the SIM card 116 and connectors (128, 124). The phone-SIM mating connector 128 is shown connected to its corresponding phone-SIM connector 126 in the wireless telephone 114. The phone-SIM connector 126 is connected by one or more electrical connections 152 to a battery 150 and by other electrical connections 154 to a XCVR 118. The SIM card enclosure 112 and wireless telephone 114 optionally include electrical connections providing for recharging of the battery 114 when the cellular telephone 110 is docked to the personal computer (ref. FIGS. 3 and 6 for docked phone examples).

Figure 10:
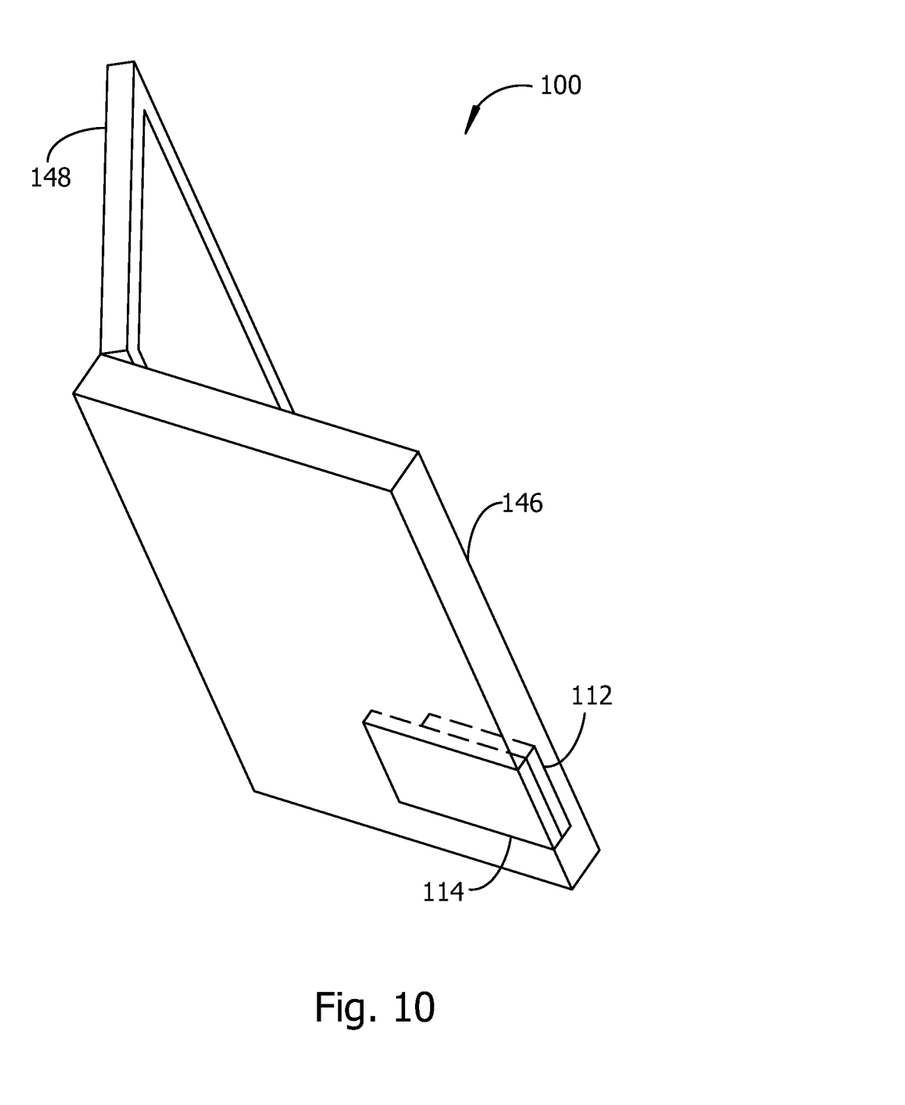
FIG. 10 shows an alternative embodiment of the invention comprising a cellular telephone and a SIM card enclosure stacked one on top of the other rather than end-to-end as in the previous figures.
Figure 14:
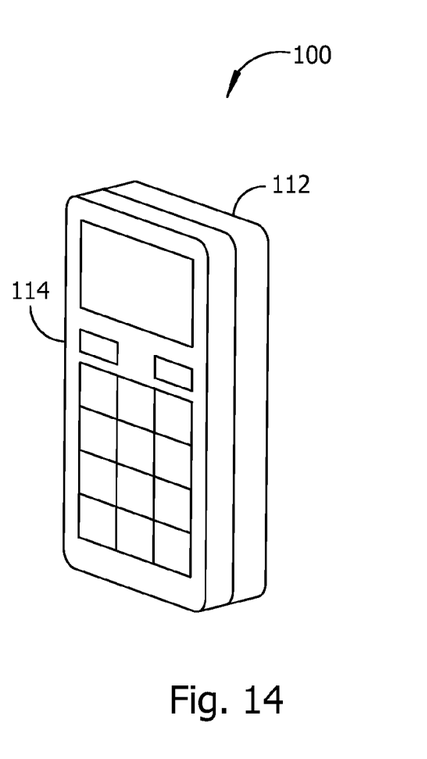
FIG. 14 is a pictorial view toward the front, top and right sides of an example of a SIM card enclosure docked to the back side of a wireless telephone to enable the wireless telephone to operate as a cellular telephone.

In the previous examples, a SIM card enclosure is shown in end-to-end contact with a wireless phone when the two are docked to one another. In alternative embodiments of the invention, the SIM card enclosure and wireless phone dock to one another side-to-side or one above the other. FIG. 10 shows an example of a SIM card enclosure 112 docked to a PC 146 and a wireless telephone 114 docked to the SIM card enclosure 112, with the SIM card enclosure 112 and wireless telephone 114 stacked one above the other. In alternative embodiments of the invention, the two stacked components are accessible from other sides of the PC 146 or are stacked in a different order than the example shown in FIG. 10. An example of a wireless telephone 114 docked to a SIM card enclosure 112 with the two components stacked on one another is shown in FIG. 14. The combination of the wireless telephone 114 and SIM card enclosure 112 in the example embodiment of the invention 100 in FIG. 14 is operable as a simple cellular telephone for making voice calls over a cellular telephone network.

Figure 11:
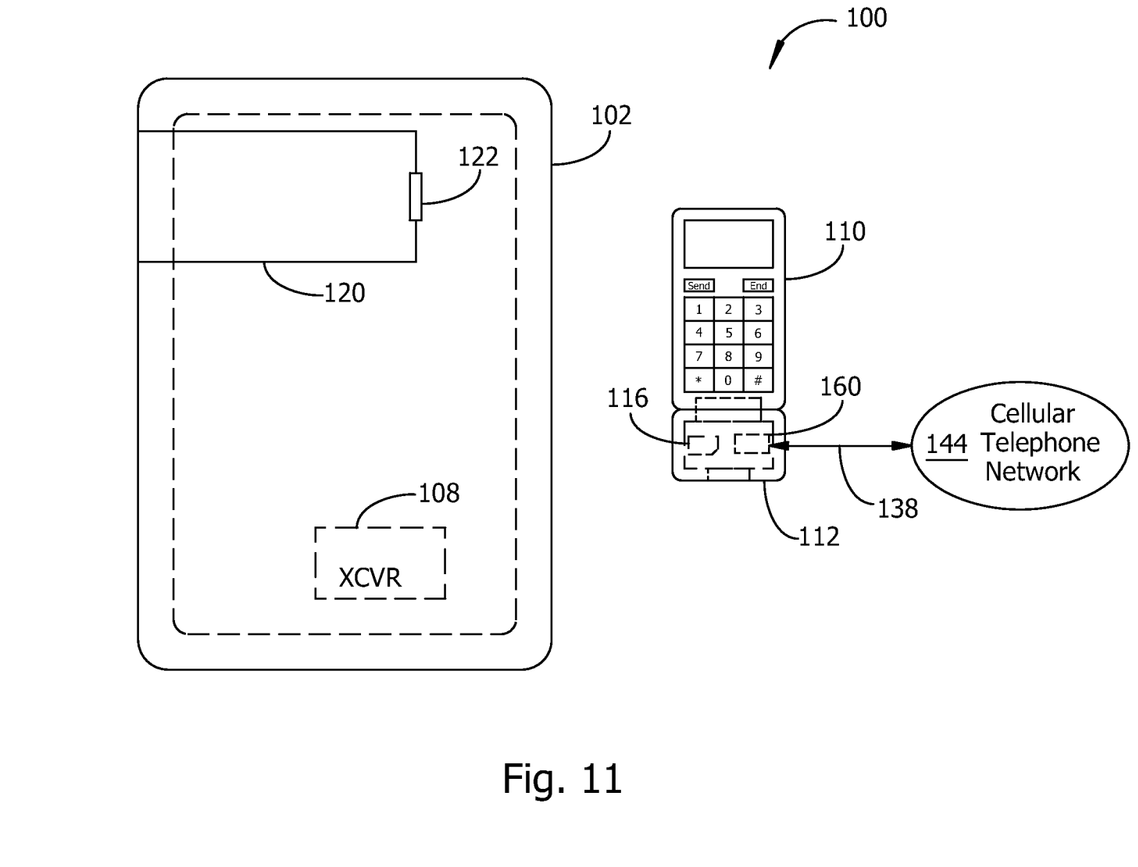
FIG. 11 is a view toward the back side of the example of a personal computer from FIGS. 1-4, showing the front side of the undocked wireless telephone, and further showing the SIM card enclosure electrically and mechanically connected to the wireless telephone to enable communication between the wireless telephone and a cellular telephone network.
Figure 12:
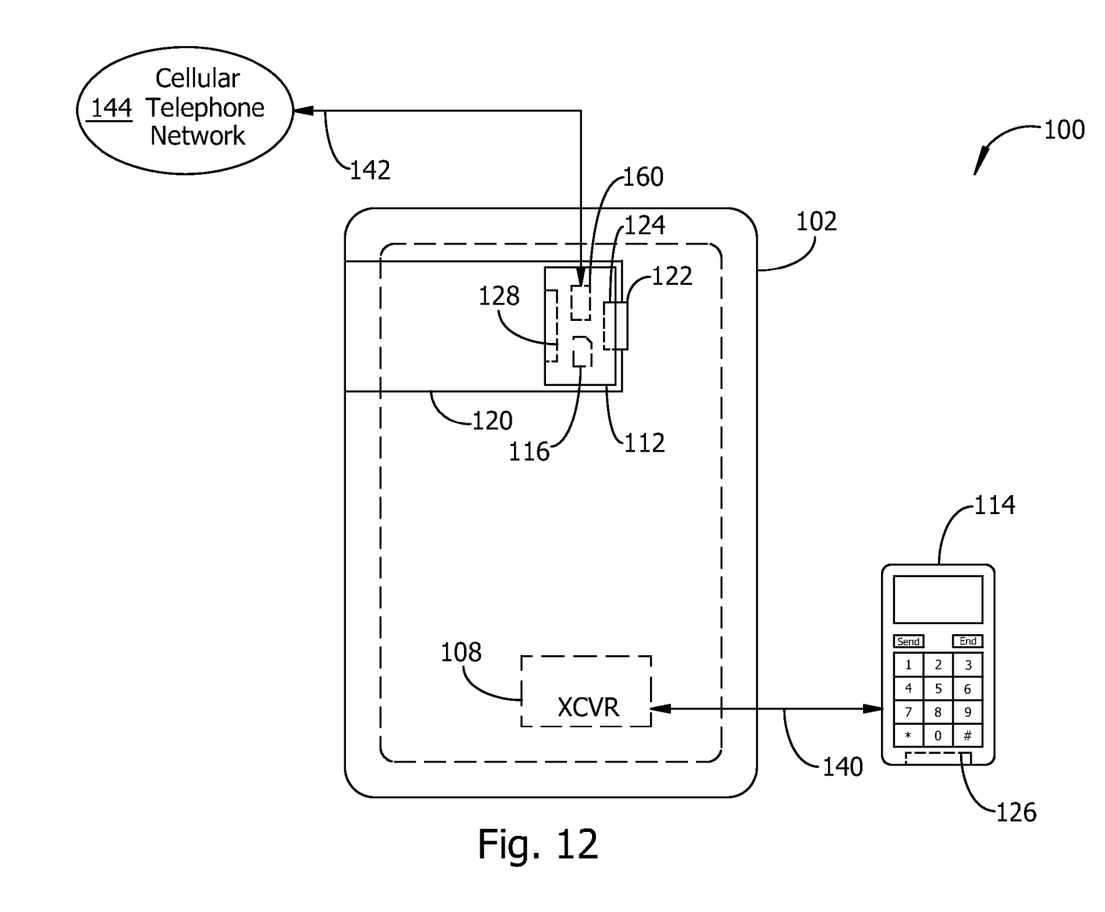
FIG. 12 is a view toward the back side of the example of a personal computer from FIGS. 1-4 and 11, showing the SIM card enclosure docked to the personal computer, the wireless telephone undocked from the personal computer and communicating with the personal computer over a local wireless communication channel, and the personal computer communicating voice and data with a cellular telephone network simultaneously with communications between the personal computer and wireless telephone.

FIGS. 11-12 illustrate examples of operation of an embodiment of the invention. FIG. 11 shows a view toward the back side of the PC 102 with the cellular telephone 110 undocked from the PC-SIM connector 122 in the docking receptacle 120. The SIM card enclosure 112 is docked to the cellular telephone 110 and carries the SIM card 116 and cellular transceiver 160, thereby enabling voice and optionally other data communications between the cellular telephone 110 and a cellular telephone network 144 for which the SIM card 116 and cellular transceiver 160 provides authorized access. Bidirectional communications between the cellular telephone 110 and the cellular telephone network 144 is represented by a wireless communication link 138 between the cellular transceiver 160 and the cellular telephone network 144. With the SIM card enclosure 112 removed from the docking receptacle 120, the PC 102 is unable to communicate directly with the cellular telephone network 144. The PC 102 may be able to communicate with other devices using its XCVR 108 or by a wired connection (not illustrated). When undocked as in the example of FIG. 11, the cellular telephone 110 may be operated independently of the PC 102 for communications over the cellular telephone network 144.

FIG. 12 shows a view toward the back side of the PC 102 with the SIM card enclosure 112 docked in the docking receptacle 120 on the PC 102 and the wireless telephone 114 undocked from the PC 102. The wireless telephone 114 is separated from the SIM card enclosure 112 by disconnecting the phone-SIM connector 126 from the phone-SIM mating connector 128. When the SIM card enclosure 112 is docked to the PC 102, the SIM card 116 and cellular transceiver 160 enable communication between the PC 102 and the cellular telephone network 144 over a cellular wireless communications link 142. In the configuration illustrated in the example of FIG. 12, the wireless telephone 114 is unable to communicate directly with the cellular telephone network because the SIM card 116 and cellular transceiver 160 are in the SIM card enclosure 112 docked to the PC 102. However, the wireless telephone 114 may still communicate with the PC 102 by a wireless connection 140 between the wireless telephone's XCVR 118 (Ref. FIG. 9) and the PC's XCVR 108. Disconnecting the SIM card enclosure 112 from the wireless telephone 114 does not disable the telephone's second communications channel, i.e., wireless communications link 140. Voice communications using the wireless telephone 114 may be conducted over the wireless link 140 to the PC 102 and then to the cellular telephone network 144 over a wireless link 142 between the PC and the cellular telephone network 144. Alternately, voice communications may be conducted using Voice Over Internet Protocol (VOIP) from the wireless telephone 114 to the PC 102 and then to an Internet connection established through the cellular telephone network 144.

Figure 15:
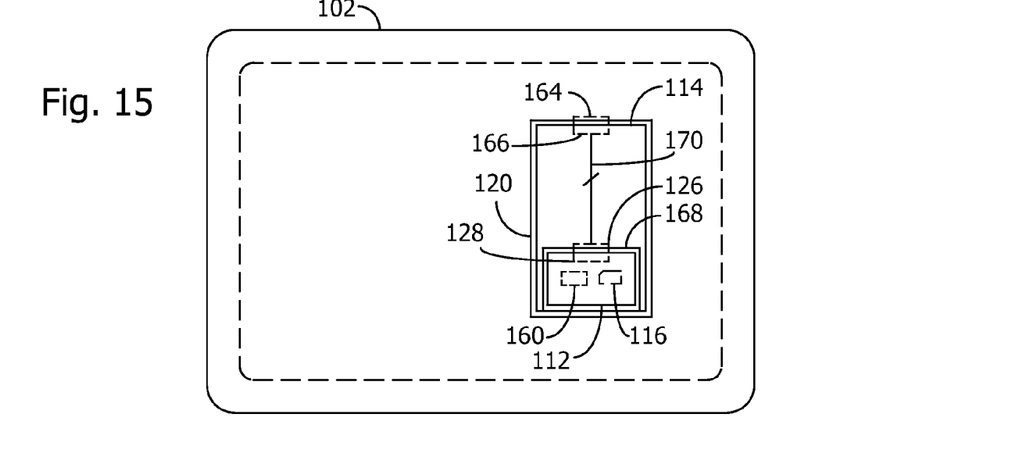
FIG. 15 is a view toward the back side of an example of a personal computer, showing an alternative embodiment of the invention in which the wireless phone is docked with the personal computer by inserting the phone in a docking channel on the back of the personal computer, and the SIM card enclosure is docked to the wireless phone and electrically connected to the personal computer by inserting the SIM card enclosure into another docking receptacle on the wireless phone.
Figure 16:
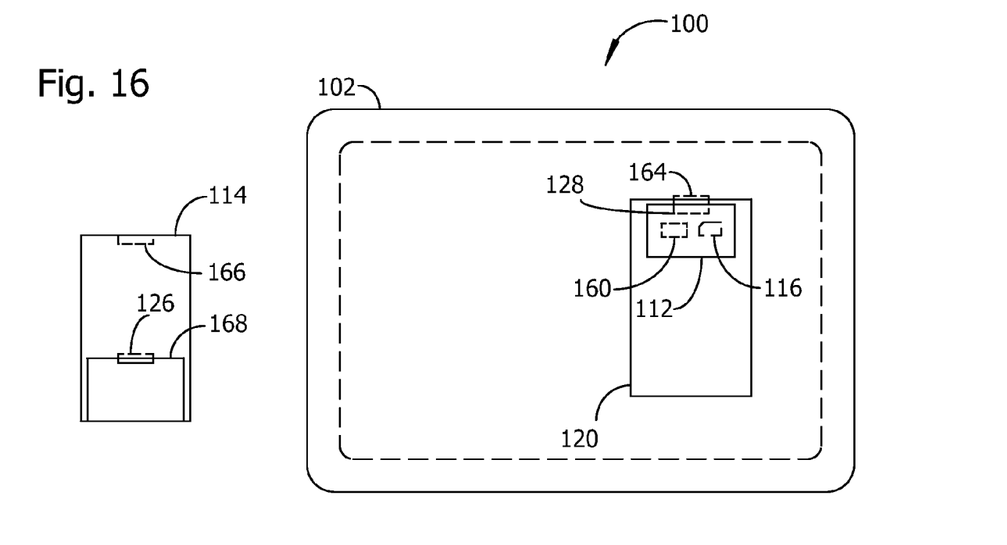
FIG. 16 continues the example of FIG. 15, showing the wireless phone undocked from the personal computer and the SIM card enclosure undocked from the wireless phone and docked to the personal computer.

FIGS. 15-16 illustrate another alternative embodiment of the invention in which a SIM card enclosure engages a docking channel in the wireless telephone and the wireless telephone engages a docking channel in the personal computer. FIG. 15 shows a view toward the back side of a PC 102 having a docking channel 120 adapted to securely hold a wireless telephone 114. While docked to the PC 102, a phone-PC mating connector 166 in the wireless telephone 114 is mechanically and electrically connected to a corresponding PC connector 164 in the PC 102. A SIM card enclosure 112 is shown installed in a docking receptacle 168 in the wireless telephone 114, with the phone-SIM mating connector 128 on the SIM card enclosure 112 electrically and mechanically connected to a corresponding phone-SIM connector 126 on the wireless telephone 114. The phone-SIM connector 126 is further connected to the phone-PC mating connector 166 by a plurality of electrical connections 170, thereby enabling the PC 102 to access the SIM card 116 and cellular transceiver 160 in the SIM card enclosure 112 for bidirectional communications with a cellular telephone network. FIG. 16 continues the example of FIG. 15, showing the wireless telephone 114 undocked from the PC 102 and the SIM card enclosure 112 undocked from the docking receptacle 168 in the wireless phone 114 and docked to the PC 102 in the docking receptacle 120 on the PC. In the example of FIG. 16, the wireless telephone 114 may communicate with the PC 102 and the PC 102 may communicate with a cellular telephone network as previously described in the example of FIG. 12.

Unless expressly stated otherwise herein, ordinary terms have their corresponding ordinary meanings within the respective contexts of their presentations, and ordinary terms of art have their corresponding regular meanings.

What is claimed is:

1. An apparatus, comprising:
   exactly one cellular network transceiver;
   exactly one Subscriber Identification Module (SIM) card;
   exactly one SIM card enclosure formed with an internal cavity adapted to receive said SIM card, comprising:
      said cellular network transceiver; and
      said SIM card electrically connected to said cellular network transceiver;
   a wireless telephone adapted for docking and undocking with said SIM card enclosure; and
   a personal computer having a docking receptacle,
   wherein said cellular network transceiver enables cellular telephone network communications by said personal computer when said SIM card enclosure is docked in said docking receptacle and when said SIM card enclosure is docked to said personal computer and undocked from said wireless telephone,
   said cellular network transceiver enables cellular telephone network communications by said wireless telephone when said SIM card enclosure and said wireless telephone are undocked from said personal computer and said SIM card enclosure is docked to said wireless telephone, and
   wireless communications between said wireless telephone and said personal computer are enabled when said wireless telephone is undocked from said SIM card enclosure.

2. The apparatus of claim 1, wherein said personal computer is operable as a WiFi hotspot when said SIM card enclosure is docked to said personal computer.

3. The apparatus of claim 1, further comprising:
   said personal computer further comprises a wireless communication transceiver; and
   said wireless telephone further comprises a wireless communication transceiver for communicating with said wireless communication transceiver in said personal computer.

4. The apparatus of claim 3, wherein said wireless communication transceiver in said personal computer and said wireless communication transceiver in said wireless telephone are compatible for communications with one another according to Bluetooth(R) protocols.

5. The apparatus of claim 3, wherein said wireless communication transceiver in said personal computer and said wireless communication transceiver in said wireless telephone enable concurrent voice communications between said wireless telephone and said personal computer and cellular network communications by said personal computer.

6. The apparatus of claim 1, wherein said wireless telephone includes a battery that is rechargeable when said wireless telephone is docked to said SIM card enclosure and said SIM card enclosure is docked to said personal computer.

7. The apparatus of claim 1, further comprising:
   said wireless telephone further comprises a phone-SIM connector;
   said SIM card enclosure further comprises a phone-SIM mating connector and a PC-SIM mating connector; and
   said personal computer further comprises a PC-SIM connector positioned in said docking receptacle.

8. The apparatus of claim 7, wherein said phone-SIM connector is mechanically and electrically connected to said phone-SIM mating connector when said wireless telephone is docked to said SIM card enclosure and said PC-SIM connector is mechanically and electrically connected to said PC-SIM mating connector when said SIM card enclosure is docked to said personal computer.

9. The apparatus of claim 1, wherein said personal computer is a tablet computer.

10. The apparatus of claim 1, wherein said personal computer has a fold-down display.

11. The apparatus of claim 1, wherein said SIM card enclosure is adapted to hold a ReUsable Identification Module (R-UIM) for a cellular telephone.

12. The apparatus of claim 1, wherein said wireless telephone is able to send and receive voice calls when said SIM card enclosure is disconnected from said wireless telephone.

13. The apparatus of claim 1, wherein said personal computer is able to send and receive data over a cellular telephone network when said wireless telephone is turned off.

14. The apparatus of claim 1, wherein said docking receptacle receives said SIM card enclosure, and further comprising a second docking receptacle on said personal computer, said second docking receptacle adapted to receive said wireless telephone.

15. The apparatus of claim 1, further comprising a docking receptacle on said wireless telephone, said docking receptacle on said wireless telephone adapted to receive said SIM card enclosure.

16. The apparatus of claim 1, wherein said cellular network transceiver is a transceiver for communicating with a global system for mobile communications (GSM) cellular telephone network.

17. The apparatus of claim 1, wherein said cellular network transceiver is a transceiver for communicating with a code division multiple access (CDMA) cellular telephone network.

* * * * *